United States Patent [19]

Giebeler

[11] Patent Number: 4,566,672
[45] Date of Patent: Jan. 28, 1986

[54] PRESSURE BALANCED BALL VALVE

[76] Inventor: James F. Giebeler, 3655 El Camino Dr., San Bernardino, Calif. 90204

[21] Appl. No.: 550,485

[22] Filed: Nov. 9, 1983

[51] Int. Cl.[4] ............................................. F16K 25/00
[52] U.S. Cl. .................... 251/192; 251/283; 251/315
[58] Field of Search ............. 251/152, 172, 192, 283, 251/309, 315

[56] References Cited

U.S. PATENT DOCUMENTS

| | | | |
|---|---|---|---|
| 1,759,060 | 5/1930 | Moore | 251/152 |
| 2,930,576 | 3/1960 | Sanctuary | 251/283 |
| 3,072,379 | 1/1963 | Hamer | 251/283 |
| 3,154,094 | 10/1964 | Bredtschneider et al. | 251/315 |
| 3,542,054 | 11/1970 | Works | 251/172 |
| 3,799,499 | 3/1974 | Shur | 251/309 |
| 4,150,810 | 4/1979 | Laignel et al. | 251/315 |

Primary Examiner—Martin P. Schwadron
Assistant Examiner—Sheri M. Novack
Attorney, Agent, or Firm—Lyon & Lyon

[57] ABSTRACT

A pressure balanced ball valve assembly includes a ball valve mounted within a unitary cage which has limited axial movement within a stationary tubular body. Annular pistons are slidably mounted within the cage for movement toward and away from the outer surface of the ball valve. Pressure transfer balance conduits extend from locations on one side of the ball valve to annular chambers at opposite ends of the cage. The effective area on the ball valve subjected to upstream pressure is balanced by the effective area of an annular chamber in which the same unit pressure acts on the downstream end of the cage. The balance conduits each lead from one side of the ball valve to a remote chamber at the other end of the cage.

6 Claims, 14 Drawing Figures

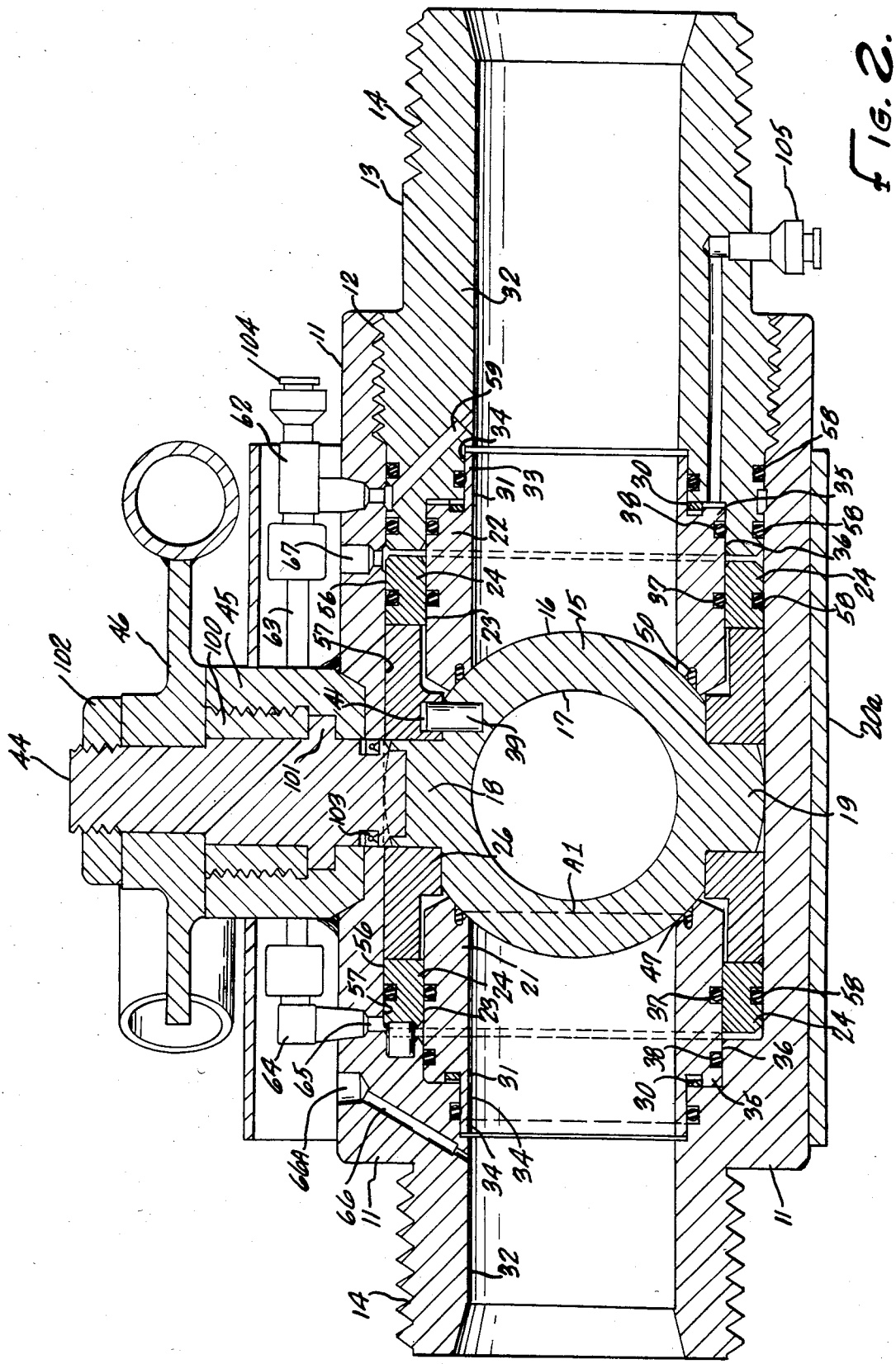

PRESSURE BALANCED BALL VALVE

This invention relates to balanced valves of the type having a valve member which may be turned between open and closed position and which has an outer surface contacted by elastomeric seal rings. This invention will be explained in connection with a ball valve having a spherical sealing surface but it is recognized that the valve member may have an outer surface which is cylindrical, or formed as some other conic surface.

The principal object of this invention is to provide a valve assembly in which the turnable valve member is mounted in such a manner that the pressures upstream and downstream are balanced, enabling the valve to be turned between closed and open positions with very low frictional resistance, even when pressurized for either side.

Another important object of this invention is to provide such a blanced valve assembly in which the valve member is mounted for limited axial movement in a tubular housing and is carried by a cage slidably mounted for axial movement within the tubular housing.

The principle of operation of the valve device is that the upstream pressure exerted against the outer surface of the turnable valve member in closed position is balanced by pressure in an annular chamber acting in the opposite direction against a cage carrying the valve member.

Other and more detailed objects and advantages will appear hereinafter.

In the drawings:

FIG. 2 is a longitudinal sectional elevation taken substantially on the lines 2—2 as shown on FIG. 1.

Figure 4:
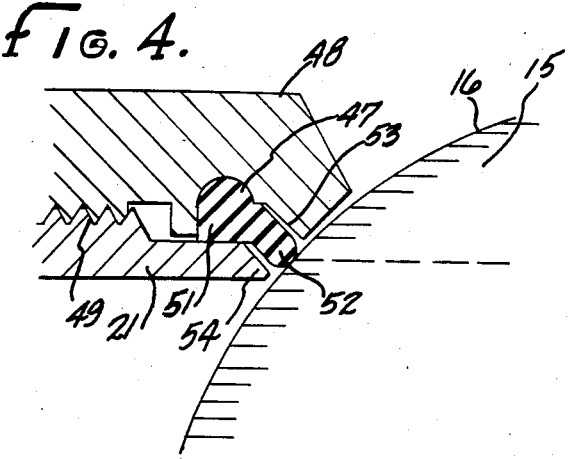
Figure 6:
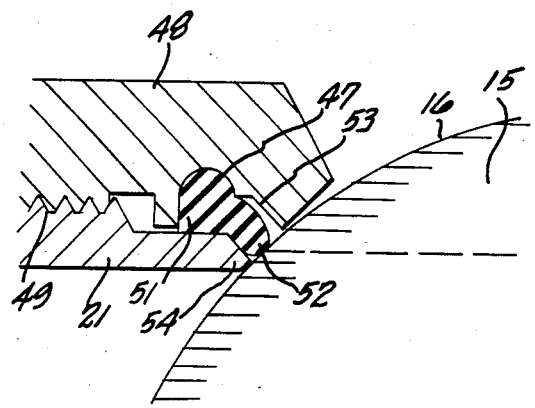
Figure 5:
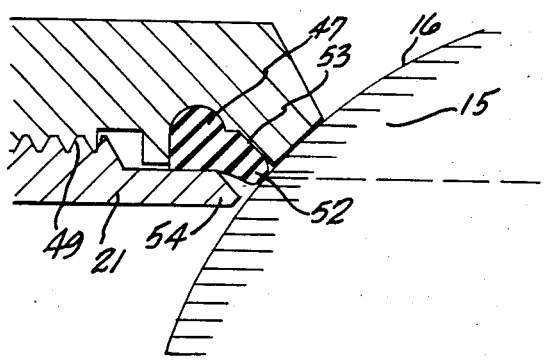

FIGS. 4, 5, and 6 are sectional views on an enlarged scale, showing positions of the sealing lips between the pistons and the outer spherical surface of the ball valve, for various pressure conditions.

Figure 1:
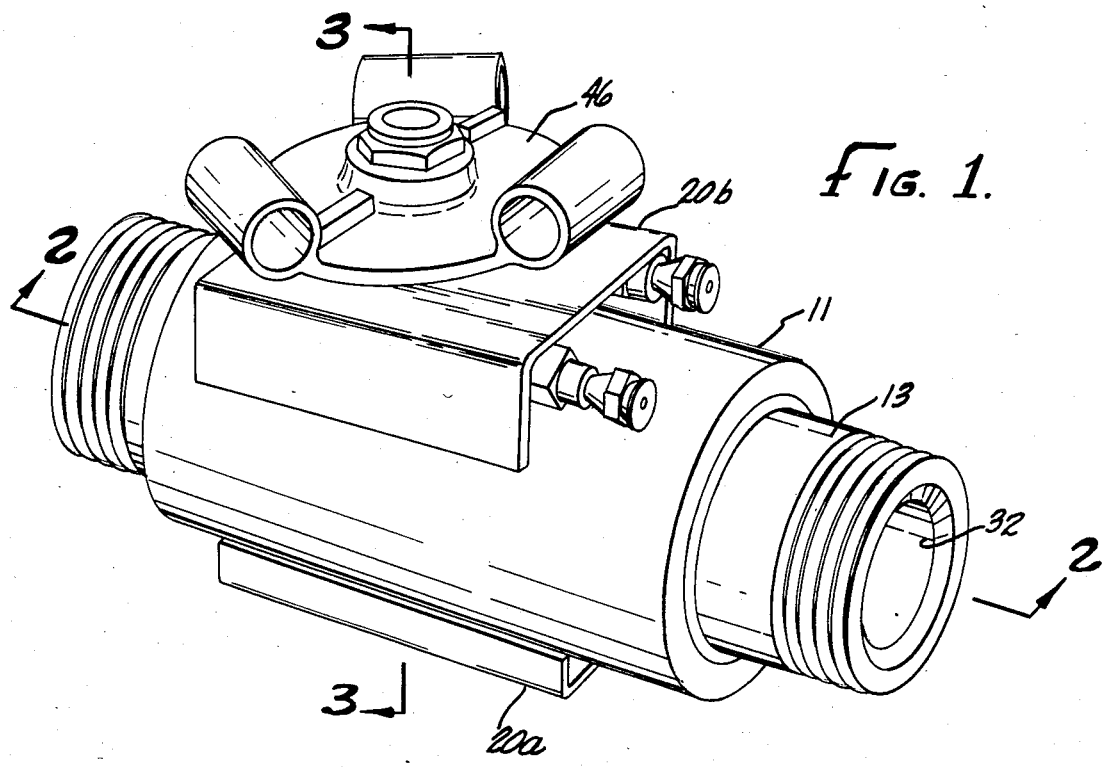
FIG. 1 is a perspective view showing a preferred embodiment of this invention.
Figure 3:
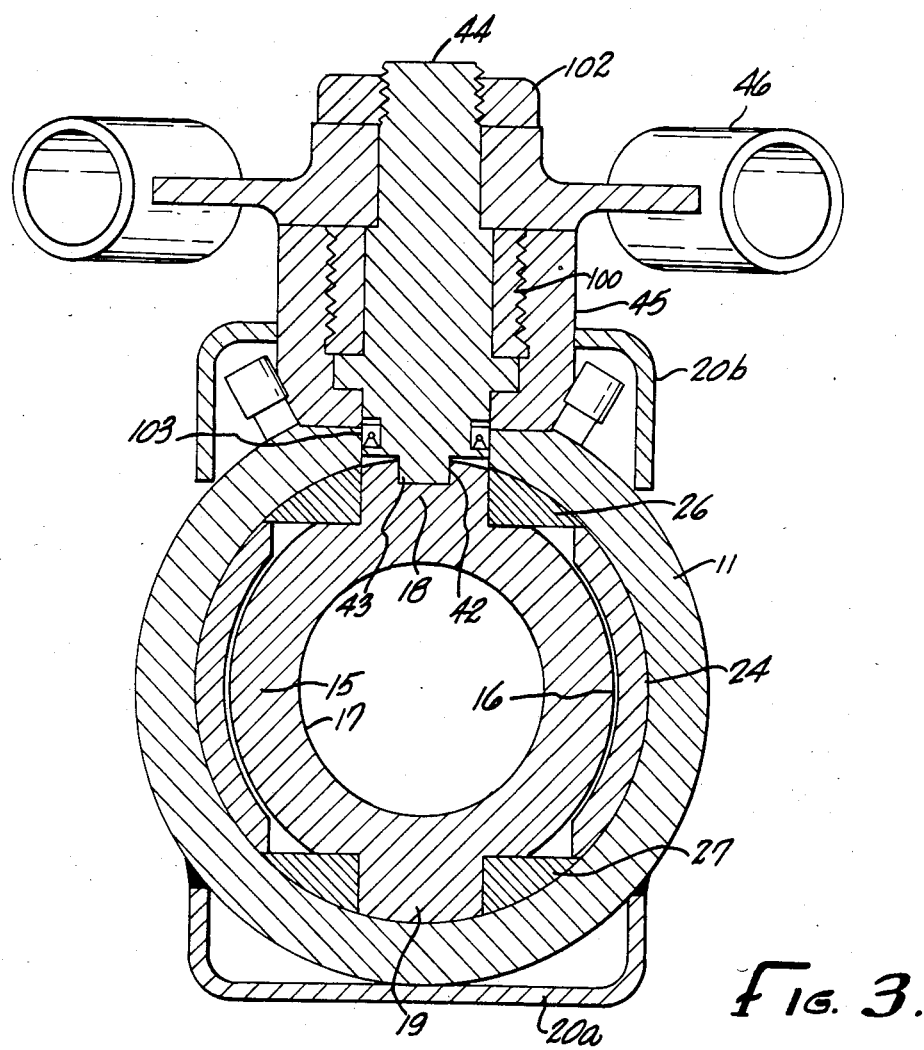
FIG. 3 is a transverse sectional view taken substantially on the lines 3—3 as shown on FIG. 1.
Figure 7:
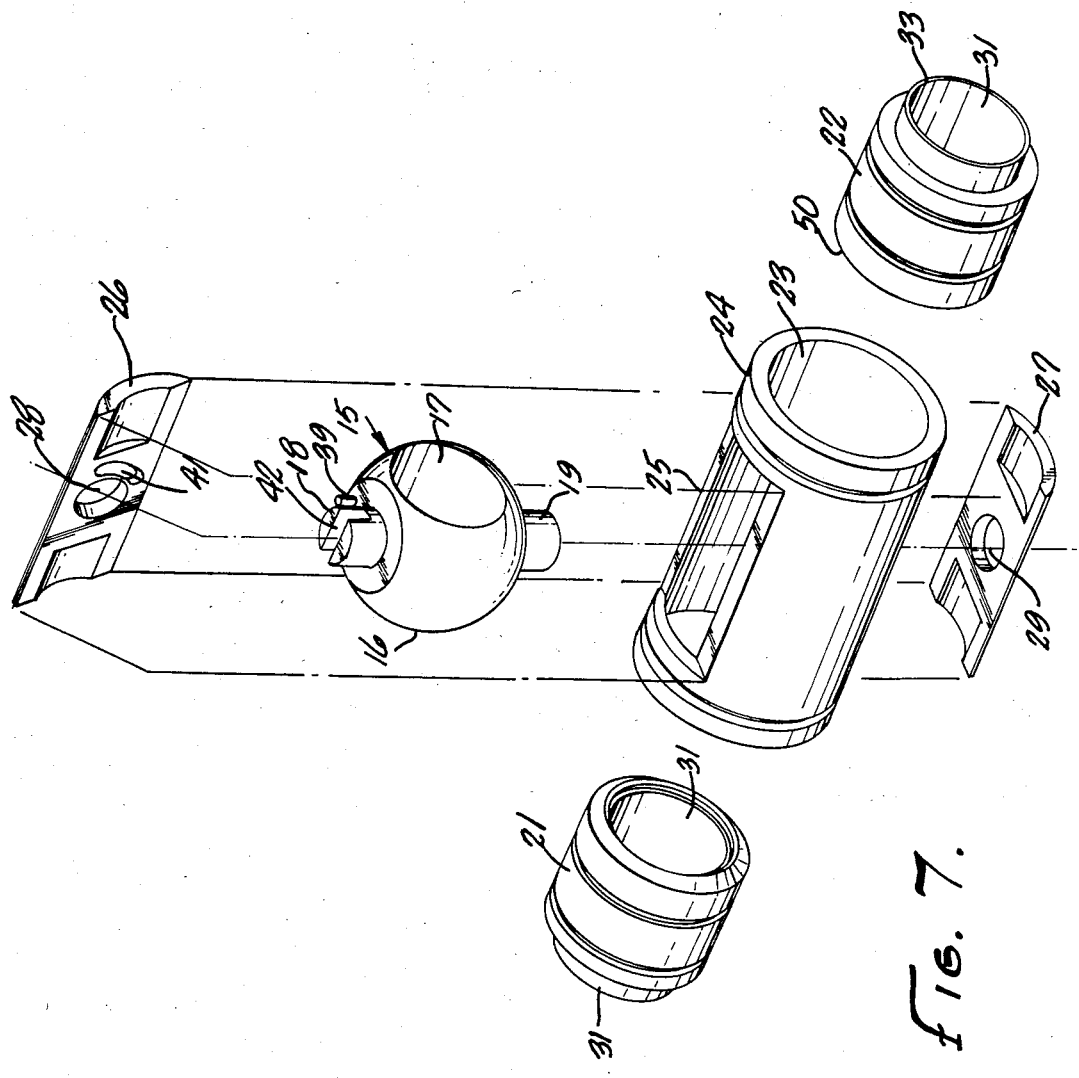

FIG. 7 is an exploded view of the assembly shown in FIGS. 1, 2 and 3.

Figure 8:
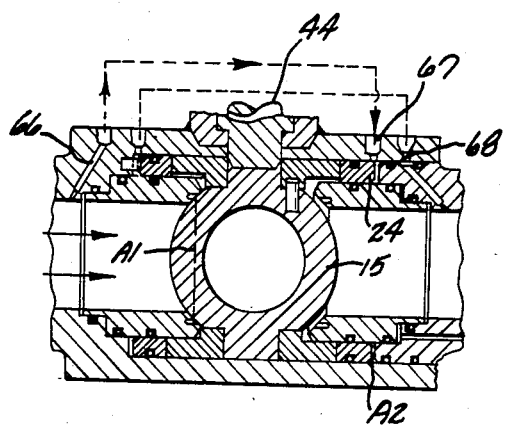

FIG. 8 is a schematic sectional diagram showing pressure applied from the left and showing sealing action on the upstream of the ball valve.

Figure 9:
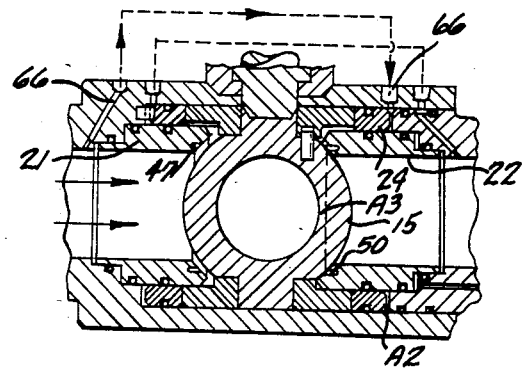

FIG. 9 is a view similar to FIG. 8, showing sealing action on the downstream side of the ball valve, in the event of failure of the upstream seal.

Figure 10:
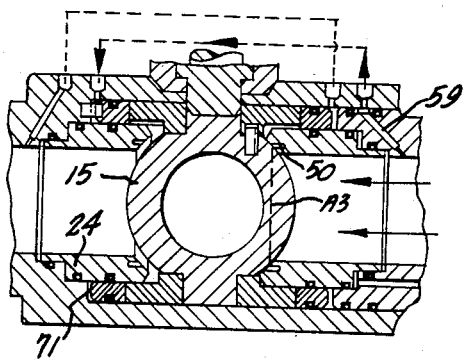

FIG. 10 is a view similar to FIG. 8, showing pressure applied from the right side and resisted by the seal on the upstream side of the ball valve.

Figure 11:
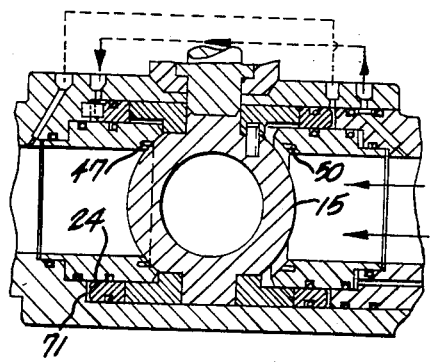

FIG. 11 is a view similar to FIG. 9, showing pressure applied from the right side and resisted by the seal on the downstream side of the ball valve, in the event of failure of the upstream seal.

Figure 12:
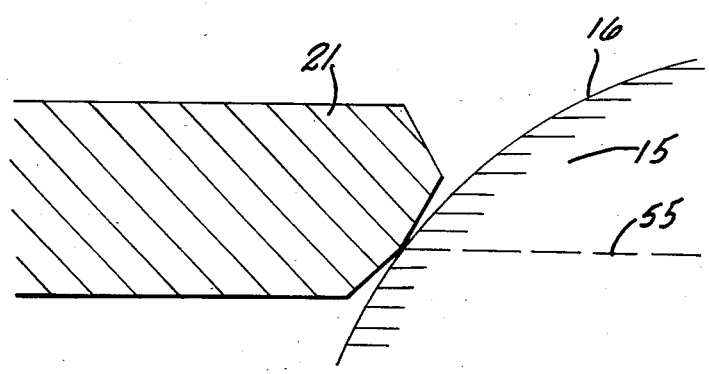

FIG. 12 shows a modified form of seal contact between one of the pistons and the outer surface of the ball valve.

Figure 13:
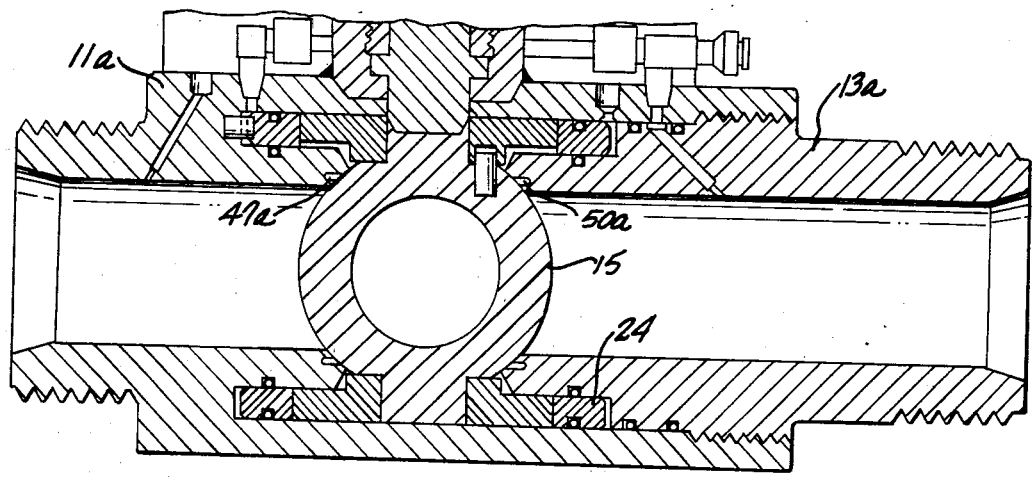

FIG. 13 is a longitudinal sectional view showing a modification.

Figure 14:
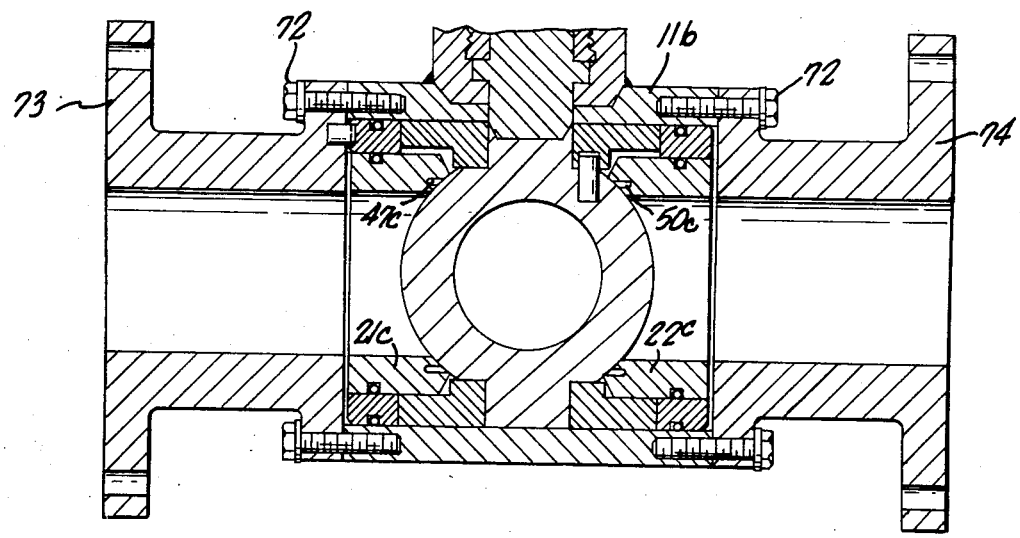

FIG. 14 is a longitudinal sectional view showing another modification.

Referring to the drawings, the pressure balanced valve assembly generally designated 10 is provided with a tubular body 11 connected by threads 12 to the body extension 13, so that the body parts 11 and 13 function as a single integral unit. Opposite ends of the tubular body 11 and body extension 13 are provided with external threads 14 for connection to piping (not shown). A ball valve 15 having an outer spherical surface 16 and a central cylindrical opening 17 is provided with oppositely extending trunnions 18 and 19. Bottom and top plates 20a and 20b are provided for stability.

Duplicate annular pistons 21 and 22 are each mounted for axial sliding movement within the bore 23 of the cage 24. The cage 24 is of one-piece construction, as best shown in FIG. 7, and has two axially extending diametrically positioned openings 25 for reception of the segments 26 and 27. The segment 26 has an opening 28 for the trunnion 18 of the ball valve 15, and the segment 27 has an opening 29 for reception of the trunnion 19 of the ball valve 15. Assembly of the ball valve 15, cage 24 and segments 26 and 27 is accomplished by turning the ball valve 15 to the closed position and sliding it into the cage 24 through the opening 25 so that the trunnions 18 and 19 project upward and downward through the openings 25 in the cage 24. The segments 26 and 27 are then installed in the openings 25, with the trunnion 18 extending through the opening 28 and the trunnion 19 extending through the opening 29. The annular pistons 21 and 22 are then moved through the cage bore 23 to bring their seal rings 47 and 50 into contact with the outer spherical surface 16 of the ball valve 15.

Each of the pistons 21 and 22 has a central bore 31 of the same size and aligned with the bores 32 in the tubular body 11 and body extension 13. Each piston 21 and 22 also has a thin extension rim 33 slidably received in a recess 34 provided in the tubular body 11 and body extension 13. A portion 35 of the outer part of each of the pistons is received within a counterbore 36 in the tubular body 11 and body extension 13. "O" rings 37 and 38 seal against the cage 24 and the counterbore 36. Springs 30 may be provided to bias the pistons 21 and 22 to move toward the ball valve 15.

Means are provided for turning the ball valve 15 through 90° to position its cylindrical opening 17 in alignment with the piston openings 31, or to move it to the closed position as shown in FIG. 2. A pin 39 fixed on the ball valve 15 travels in an arcuate slot 41 provided in the stationary segment 26, as shown in FIG. 7, to limit turning movement of the ball valve 15 in either direction. A transverse groove 42 in the end of the trunnion 18 loosely receives a tongue 43 on the end of the stem 44. The stem 44 is mounted to turn within the stationary housing part 45 fixed to the tubular body 11. Turning of the stem 44 is accomplished by means of the rotary control wheel 46. The stem 44 is held in place by threaded insert 100 in housing part 45 which abuts against flange 101. A nut 102 holds the control wheel 46 in place. A seal ring 103 prevents seepage up along the stem 44.

The mounting of seal ring 47 on the piston 21 is best shown in the enlarged FIGS. 4, 5 and 6. A retainer ring 48, not shown in the other figures, is positioned within the piston 21 by means of threads 49. The seal ring 47 has a bulbous portion 51 clamped in place by means of the retainer ring 48 and also has an integral lip 52 which contacts the outer spherical surface 16 of the ball valve 15. The seal ring 47 and lip 52 are formed of elastomeric material so that the lip 52 may take the relaxed position shown in FIG. 4 or either of the pressurized positions shown in FIGS. 5 and 6. In FIG. 5 the pressure under the lip 52 moves it into contact with the frustro conical wall 53 on the retainer ring 48. In FIG. 6 pressure from above moves the lip 52 into contact with the frustro conical surface 54 on the piston 21. In each of these cases, the effective sealing point denoted by the horizontal dashed line 55 is precisely the same, even though axial movement of either or both pistons 21 and 22 has occurred. The mounting of the seal ring 50 on the piston 22 is the same as that described above for the seal ring 47 on the piston 21.

It is important to note that the effective sealing area defined by the circumference of the rings 47 and 50 (denoted as line "A1" in FIG. 2) is the same as the effective annular area of the ends of the cage 24. The outer cylindrical surface 56 of the ends of the cage 24 slide within the bores 57 contacted by the seal rings 58. The effective annular sealing area of the cage 24 therefore lies between the concentric surfaces 23 and 57. In general, it is the principle of operation of this preferred form of the invention that the pressure within the body upstream from the ball valve 15 is balanced by the pressure on the downstream end of the cage 24.

As shown in FIG. 2, a pressure transfer or balance passage 59 extends from the bore 32 of the body extension 13 via stationary port 61, fittings 62, conduit 63 and fitting 64 to the stationary port 65 at the left end of the cage 24, as viewed in FIG. 2. This amounts to a pressure transfer means between the interior of the body extension 13 and the far end of the cage 24, on the other side of the ball valve 15. Similarly, there is provided a pressure transfer or balance passage 66 in the tubular body 11 to the left of the ball valve 15 and this passage 66 extends through fittings and conduit (not shown) from the socket 66A to the socket 67, both on the tubular body 11. This amounts to a pressure transfer means from the interior of the tubular body 11 to the far end of the cage 24 on the other side of the ball valve 15. Grease fittings 104 and 105 are provided to allow for manually pressurizing either side of the ball valve 15.

The operation of the device is best described in connection with the schematic sectional diagrams of FIGS. 8, 9, 10 and 11. In FIG. 8, the upstream pressure (indicated by the horizontal arrows) is applied against the left side of the ball valve 15 and acts over the effective area $A_1$ indicated by the vertical dashed line. This upstream pressure is also transmitted through the first pressure transfer passage 66,67 to the annular pressure chamber 68 on the downstream side of the cage 24. Since the effective area $A_2$ of this pressure chamber 68 is equal to the area $A_1$, the force against the ball valve 15 is balanced by the downstream force on the cage 24. Accordingly, the stem 44 may be used to turn the ball valve between closed and open position without the need to overcome high frictional resistance.

In FIG. 9 the upstream pressure is again applied in the direction of the horizontal arrows and it is assumed that the seal ring 47 on the upstream piston 21 has failed allowing a seepage across the ball, and seal ring 50 becomes the effective seal, so that the effective area on the upstream side of the ball valve 15 has increased. Since the effective area $A_2$ acting on the cage 24 is less than this increased area, the ball valve 15 and cage 24 move slightly to the right to bring the seal ring 50 on the piston 22 into sealing engagement with the outer spherical surface of the ball valve 15, creating an Area $A_3$ which is equal to Area $A_2$. The forces on these two areas $A_3$ and $A_2$ oppose each other neutralizing the high frictional resistance. Accordingly, the ball valve assembly does not leak even though the upstream seal 47 has failed, and the valve is still easy to operate between closed and open position.

FIG. 10 shows pressure being applied from the right side as indicated by the horizontal arrows. The seal ring 50 acts over the effective area $A_3$ and this is balanced by the pressure in the chamber 71 acting on the left end of the cage 24. The chamber 71 receives pressure through the pressure transfer balance conduit 59,61. Accordingly, it will be understood that the ball valve assembly functions in the same manner whether the pressure is applied from the left or from the right. FIG. 11 shows the operation when the pressure is applied from the right and when the seal ring 50 has failed so that the ball valve 15 moves to the left because of the larger area exposed to the pressure. The seal ring 47 seals against the outer spherical surface of the ball valve 15 and this force is balanced by the pressure in the chamber 71 at the left end of the cage 24. Accordingly, the ball valve 15 does not leak even if the seal ring 50 fails, and the valve is easy to operate because of the balanced equal areas.

In the modified form of the invention shown in FIG. 13, the axially movable duplicate pistons are not used. Instead, the seal rings 47a and 50a are carried on the tubular body 11a and extension 13a. In other respects, the parts and mode of operation are the same as that previously described except that axial movement of the cage 24 and ball valve 15 is proportionally less.

The modified form of the invention shown in FIG. 14 is similar to that shown in FIG. 13 except that the tubular body comprises a central portion 11b connected by fasteners 72 to flanged end portions 73 and 74. While the balance passages are not shown in FIG. 14, they are the same as that shown in other forms of the invention. The seal rings 47c and 50c are carried on axially movable tubular pistons 21c and 22c. In other respects, the parts are similar and function in the same manner as previously described.

While the valve member 15 has been described as having a spherical outer surface, it is recognized that the surface need not be spherical, and indeed could be cylindrical, or could have another conic shape, if desired.

An alternative embodiment, in which seal rings 47 and 50 and the retainer ring 48 are eliminated, is shown in FIG. 12. Here, a metal-to-metal seal is shown between the piston 21 (and piston 22, but not shown) and the ball valve 15. It will be noted that the end of the piston 21 is beveled so that contact between the piston and the ball valve is at one point. It will also be noted that the point of contact is at line 55 so as to retain the equal areas of pressure upstream and downstream of the ball valve:

I claim:

1. In a pressure balanced valve assembly, the combination of: a tubular body having a longitudinal axis, a valve member in said body mounted to turn about a transverse axis, a cage mounted for axial movement longitudinally within said body, first and second annular pistons mounted on opposite sides of said valve member, said pistons being mounted for axial movement within said cage toward and away from the outer surface of said valve member, the effective cross sectional area of the contact between each piston and the surface of said valve member being equal to the effective cross sectional area of each end of said cage, first pressure transfer means, a first end thereof communicating with the interior of said body near said first piston, second pressure transfer means, a first end thereof communicating with the interior of said body said second piston, a first pressure chamber within said body adjacent one end of said cage, a second pressure chamber within said body adjacent the other end of said cage, first hydraulic means establishing communication between said first pressure transfer means and said second pressure chamber, and second hydraulic means establishing communication between said second pressure transfer means and said first pressure chamber, whereby pressure in said body upstream from said valve member is balanced by pressure on the downstream end of said cage.

2. The combination set forth in claim 1 in which said valve member comprises a spherical plug having a flow passage alignable with said annular pistons.

3. The combination set forth in claim 1 in which said valve member comprises a cylindrical plug having a flow passage alignable with said annular pistons.

4. In a pressure balanced valve assembly, the combination of: an elongated tubular body, a cage mounted for axial movement longitudinally within said body, a ball valve mounted within said cage for movement about a transverse axis, a first annular piston mounted on one side of said ball valve, a second annular piston mounted on the other side of said ball valve, said pistons being mounted for axial movement within said cage toward and away from the outer surface of said ball valve, the effective cross sectional area of the contact between each piston and the surface of said ball valve being equal to the effective cross sectional area of each end of said cage, first pressure transfer means, a first end thereof communicating with the interior of said body near said first piston, second pressure transfer means a first end thereof communicating with the interior of said body near said second piston, a first pressure chamber within said body adjacent one end of said cage, a second pressure chamber within said body adjacent the other end of said cage, first hydraulic means establishing communication between said first pressure transfer means and said second pressure chamber, and second hydraulic means establishing communication between said second pressure transfer means and said first pressure chamber, whereby pressure in said body upstream from said ball valve is balanced by pressure on the downstream end of said cage.

5. In a pressure balanced valve assembly, the combination of: an elongated tubular body, a cage mounted for axial movement longitudinally within said body, a ball valve mounted within said cage for movement about a transverse axis, means including seal rings contacting opposite sides of said ball valve, the effective cross sectional area of the contact between each seal ring and the surface of said ball valve being equal to the effective cross sectional area of each end of said cage, first balance conduit means, a first end thereof communicating with the interior of said body on one side of said ball valve, second balance conduit means, a first end thereof communicating with the interior of said body on the other side of said ball valve, a first pressure chamber within said body adjacent one end of said cage, a second pressure chamber within said body adjacent to other end of said cage, means establishing communication between said first balance conduit and said second pressure chamber, and means establishing communication between said second balance conduit and said first pressure chamber, whereby pressure in said body from either side of said ball valve is balanced by pressure on the remote end of said cage.

6. In a pressure balanced valve assembly, the combination of: an elongated tubular body, a cage mounted for axial movement longitudinally within said body, a ball valve mounted within said cage for movement about a transverse axia, seal rings mounted on said body contacting opposite sides of said ball valve, the effective cross sectional area of the contact between each seal ring and the surface of said ball valve being equal to the effective cross sectional area of each end of said cage, first balanced conduit means, a first end thereof communicating with the interior of said body on one side of said ball valve, second balance conduit means, a first end thereof communicating with the interior of said body on the other side of said ball valve, a first pressure chamber within said body adjacent one end of said cage, a second pressure chamber within said body adjacent the other end of said cage, means establishing communication between said first balance conduit and said second pressure chamber, and means establishing communication between said second balance conduit and said first pressure chamber, whereby pressure in said body from either side of said ball valve is balanced by pressure on the remote end of said cage.

* * * * *